United States Patent
Wu et al.

(10) Patent No.: US 8,204,058 B2
(45) Date of Patent: Jun. 19, 2012

(54) AUTOMATIC FRAMING SELECTION

(75) Inventors: David Tze-Si Wu, Fremont, CA (US); Soren Lasen, San Francisco, CA (US); Kartik Subbana, Fremont, CA (US); Nitin Gupta, Fremont, CA (US); Vivasvat Keswani, Fremont, CA (US)

(73) Assignee: Riverbed Technology, Inc., Sna Francisco, CA (US)

( * ) Notice: Subject to any disclaimer, the term of this patent is extended or adjusted under 35 U.S.C. 154(b) by 440 days.

(21) Appl. No.: 11/494,364

(22) Filed: Jul. 26, 2006

(65) Prior Publication Data
US 2007/0064717 A1 Mar. 22, 2007

Related U.S. Application Data

(60) Provisional application No. 60/703,616, filed on Jul. 28, 2005.

(51) Int. Cl.
*H04L 12/28* (2006.01)
(52) U.S. Cl. .......................... 370/392; 709/227
(58) Field of Classification Search .................. 370/352, 370/400; 726/23, 25; 709/227
See application file for complete search history.

(56) References Cited

U.S. PATENT DOCUMENTS

| | | | |
|---|---|---|---|
| 5,754,774 A | 5/1998 | Bittinger et al. | |
| 6,178,461 B1 | 1/2001 | Chan et al. | |
| 6,415,329 B1 | 7/2002 | Gelman et al. | |
| 6,519,644 B1 | 2/2003 | Lindquist et al. | |
| 6,535,878 B1 | 3/2003 | Guedalia et al. | |
| 6,874,017 B1 | 3/2005 | Inoue et al. | |
| 6,877,043 B2 | 4/2005 | Mallory et al. | |
| 7,185,232 B1 * | 2/2007 | Leavy et al. | 714/41 |
| 7,277,931 B1 * | 10/2007 | Booth et al. | 709/220 |
| 2001/0014104 A1 * | 8/2001 | Bottorff et al. | 370/471 |

(Continued)

FOREIGN PATENT DOCUMENTS

WO  WO 01/17194 A2  3/2001

(Continued)

OTHER PUBLICATIONS

Amer, Ahmed et al., "File Access Prediction with Adjustable Accuracy," 2002, *Proceedings of the Performance, Computing, and Communications Conference 2002, on 21st IEEE International*, pp. 131-140.

(Continued)

*Primary Examiner* — Dang Ton
*Assistant Examiner* — Wei Zhao
(74) *Attorney, Agent, or Firm* — Kilpatrick Townsend & Stockton LLP; Philip H. Albert (57) ABSTRACT

Network traffic is monitored and an optimal framing heuristic is automatically determined and applied. Framing heuristics specify different rules for framing network traffic. While a framing heuristic is applied to the network traffic, alternative framing heuristics are speculatively evaluated for the network traffic. The results of these evaluations are used to rank the framing heuristics. The framing heuristic with the best rank is selected for framing subsequent network traffic. Each client/server traffic flow may have a separate framing heuristic. The framing heuristics may be deterministic based on byte count and/or time or based on traffic characteristics that indicate a plausible point for framing to occur. The choice of available framing heuristics may be determined partly by manual configuration, which specifies which framing heuristics are available, and partly by automatic processes, which determine the best framing heuristic to apply to the current network traffic from the set of available framing heuristics.

26 Claims, 3 Drawing Sheets

U.S. PATENT DOCUMENTS

| | | | |
|---|---|---|---|
| 2002/0035607 A1* | 3/2002 | Checkoway et al. ............ | 709/206 |
| 2002/0064149 A1* | 5/2002 | Elliott et al. .................. | 370/352 |
| 2002/0178264 A1* | 11/2002 | Benda et al. ................... | 709/227 |
| 2003/0198241 A1* | 10/2003 | Putcha et al. .................. | 370/419 |
| 2003/0206559 A1 | 11/2003 | Trachewsky et al. | |

FOREIGN PATENT DOCUMENTS

| | | |
|---|---|---|
| WO | WO 01/53972 A2 | 7/2001 |
| WO | WO 01/78489 A2 | 10/2001 |

OTHER PUBLICATIONS

Caceres, Ramon et al., "Web Proxy Caching: The Devil is in the Details," Jun. 1998, *Proceedings of the Workshop on Internet Server Performance*, Madison, Wisconsin, pp. 111-118.

Deshpande, Mukund et al., "Selective Markov Models for Predicting Web-Page Accesses," 2004, *ACM Transactions on Internet Technology*, vol. 4, Issue 2, pp. 163-184. •.

Fan, Li et al., "Summary Cache: A Scalable Wide-Area Web Cache Sharing Protocol," Jun. 2000, *Proceedings of the IEEE/ACM Transactions on Networking*, vol. 8, No. 3, pp. 281-293.

Feldmeier, D.C. et al., "Protocol Boosters," Apr. 1998, IEEE JSAC, vol. 16, Issue No. 3, pp. 437-444.

Griffioen, James et al., "Automatic Prefetching in a WAN," Oct. 1993, *Proceedings of the IEEE Workshop on Advances in Parallel and Distributed Systems*, Technical Report # CS243-93, pp. 8-12.

Griffioen, James et al., "Reducing File System Latency using a Predictive Approach," Jun. 1994, *Proceedings of the USENIX Summer 1994 Technical Conference on USENIX*, Technical Conference, Volume 1.

Lei, Hui et al., "An Analytical Approach to File Prefetching," Jan. 1997, *Proceedings of the Annual Conference on USENIX Annual Technical Conference*, Anaheim, California, pp. 1-12.

Oly, James et al., "Markov Model Prediction of I/O Requests for Scientific Applications," Jun. 2002, *Proceedings of the 16th International Conference on Supercomputing*, pp. 147-155.

Padmanabhan et al., "Using Predictive Prefetching to Improve World Wide Web Latency," Jul. 1996, *ACM SIGCOMM Computer Communication Review*, vol. 26, No. 3, pp. 22-36.

Rhea, Sean C. et al., "Value-Based Web Caching," May 2003, *Proceedings of the 12th International Conference on World Wide Web*, Budapest, Hungary, pp. 619-628.

Tolia, Niraj, et al., "An Architecture for Internet Data Transfer," *Third Symposium on Networked Systems Design and Implementation (NSDI'06)*, San Jose, California, May 2006.

Yang, Qiang et al., "Mining Web Logs for Prediction Models in WWW Caching and Prefetching," Aug. 2001, *Proceedings of the Seventh ACM SIGKDD International Conference on Knowledge Discovery and Data Mining KDD'01*, San Francisco, California, pp. 473-478.

International Search Report of Mar. 30, 2007 for PCT application No. PCT/US06/29181.

Written Opinion of Mar. 30, 2007 for PCT application No. PCT/US06/29181.

* cited by examiner

AUTOMATIC FRAMING SELECTION

CROSS-REFERENCES TO RELATED APPLICATIONS

This application claims priority to U.S. Provisional Patent Application No. 60/703,616, filed Jul. 28, 2005, and entitled "Automatic Framing Selection." This application is related to and incorporates by reference for all purposes U.S. patent application Ser. No. 10/285,315, Filed 30 Oct. 2002, entitled "Transaction Accelerator for Client-Server Communication Systems," (Hereafter "McCanne I"), and U.S. patent application Ser. No. 10/640,405. Filed 12 Aug. 2003, entitled "Transparent Client-Server Transaction Accelerator," (Hereafter "McCanne III").

BACKGROUND OF THE INVENTION

The present invention relates generally to accelerating client-server transactions across a network. Network acceleration appliances and applications apply a variety of techniques to reduce the latency or the appearance of latency over local- and wide-area-networks. Many techniques, such as scalable data referencing as described in McCanne I and McCanne II, can benefit from sending data in a few large network packets, rather than many smaller network packets. Typically, network protocols limit the size of network packets.

It is often desirable to have the largest network packet possible to provide maximum benefit from the network acceleration techniques. However, waiting for servers and applications to produce additional data to be included in a network packet, so as to maximize the size of the network packet, can increase the latency or appearance of latency for the client or application, especially in interactive applications.

One current technique uses an algorithm similar to the Nagle algorithm to automatically concatenate a number of small buffer messages into a single buffer, referred to as Nagling, that can then be sent, or flushed, as a single network packet. In a previous implementation, either a time delay or a buffer size can trigger a buffer flush and the transmission of a network packet with the current buffer data. For example, if a time limit, such as six milliseconds, passes from the first data written to the buffer, or if the buffer reaches a size limit, such as 128 KB of data, then the buffer is flushed and a network packet is sent with the buffer data. The time limit typically triggers buffer flushes for interactive traffic and the size limit typically triggers buffer flushes when there is a steady flow of data from an application.

The time and size limits for buffers are referred to as a framing. With a single framing, there is a single limit to the buffer and a single time limit. A single framing must designed to be reasonable for a wide variety of possible networks or kinds of traffic. Unfortunately, designing such a single framing is difficult because of the enormous variety of both networks and traffic. No single framing performs reasonably well across the diversity of networks and traffic types that might be encountered; even a single installation may encounter widely-varying traffic types, either sequentially or simultaneously.

A single framing can be manually tailored to the needs and characteristics of specific networks and applications, but such tailoring requires both technical sophistication and knowledge of traffic characteristics, and can only happen with the involvement of a technically-knowledgeable user. Even with the necessary level of sophistication, knowledge, and skill, no person is able or willing to adjust the framing characteristics as traffic characteristics shift; the changes can happen too rapidly for human intervention and they happen around the clock. Further, even the fastest adjustments to a single framing are still unable to address the problem of handling simultaneous streams of traffic with very different characteristics.

It is therefore desirable for a system and method for framing network traffic to balance the need to maximize network acceleration efficiency using large network packets with the need to minimize delays in sending network packets while waiting for data to accumulate. It is further desirable for the system and method to be readily applicable to a wide variety of networks and applications. It is also desirable for a system and method to dynamically adjust framings to handle changing characteristics of network traffic. It is still further desirable for the system and method to provide efficient framing for simultaneous streams of network traffic with different characteristics.

BRIEF SUMMARY OF THE INVENTION

An embodiment of the invention monitors network traffic and automatically selects an optimal framing. The embodiment applies a selected framing heuristic to frame network traffic. At the same time, multiple different framing heuristics are speculatively evaluated with respect to the same network traffic. Each framing heuristic specifies a different set of rules used to frame network traffic. The results of the speculative evaluations of framing heuristics as applied to the current network traffic are collected and assigned scores or ranks. The framing heuristic with the best score is then selected to be used to frame subsequent network traffic.

In an embodiment, data arrives in packets from a source and the stream of received data is accumulated in a buffer. The framing heuristics determine when the accumulated data in the buffer is flushed. The flushed data may be encoded for efficient transport across a wide-area network (WAN). Alternatively, other sending or processing steps may be triggered by the buffer flush.

In an embodiment, each client/server traffic flow has a single selected framing heuristic controlling its buffer flushes. The framing heuristics may be deterministic based on byte count and/or time or based on traffic characteristics that indicate a plausible point for a buffer flush to occur. While a selected framing heuristic controls the buffer flushes for a given stream, an embodiment speculatively evaluates multiple framing heuristics to determine which framing heuristics would have triggered buffer flushes and the sizes of the buffer at the times of the buffer flushes. This information is used to score the alternative framing heuristics. The scores of alternative framing heuristics are continually compared to performance of the selected framing heuristic used to frame network traffic and used to determine if the framing heuristic should be changed. In an embodiment, the choice of available framing heuristics may be determined partly by manual configuration, which specifies which framing heuristics are available, and partly by automatic processes, which determine the best framing heuristic to apply to the current network traffic from the set of available framing heuristics.

BRIEF SUMMARY OF THE DRAWINGS

The invention will be described with reference to the drawings, in which.

DETAILED DESCRIPTION OF THE INVENTION

Figure 1:
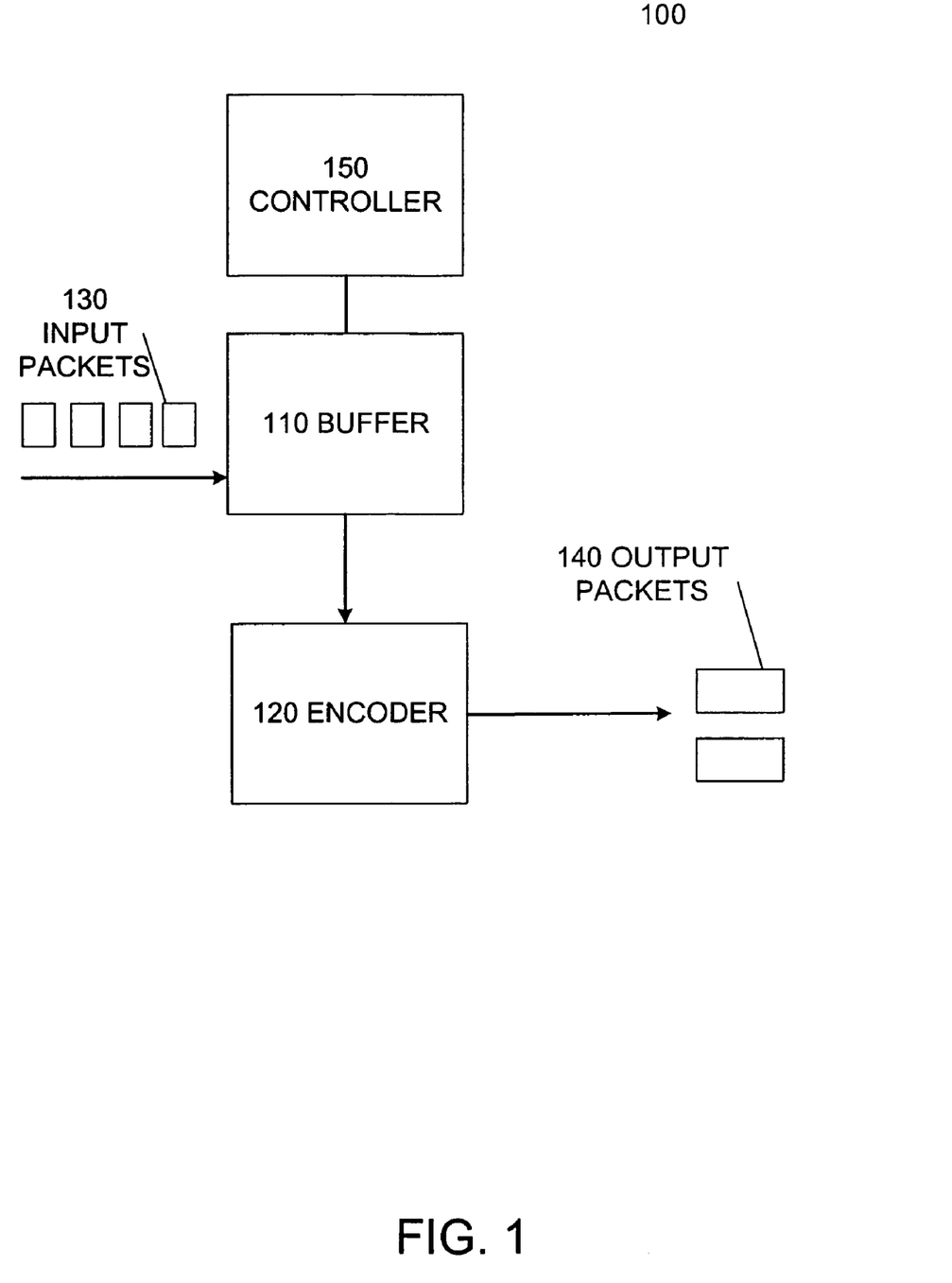
FIG. 1 shows a system suitable for implementing an embodiment of the invention.

FIG. 1 shows a system 100 suitable for implementing an embodiment of the invention. System 100 includes a buffer 110 that receives payload data from input packets 130. Input packets 130 may be received from one or more computer systems and associated with one or more applications. System 100 concatenates the data from input packets 130 into the buffer 110. A controller 150 observes the data being received and present in the buffer 110 and decides when the buffered data should be flushed. Controller 150 flushes buffer 110 and makes the buffered data available to encoder 120. Encoder 120 processes the flushed data to produce one or more output packets 140. There are numerous additional forms of buffers, queues, stacks, and similar data structures well known to those practiced in the arts, including circular buffers and shared memory; the application of the disclosed techniques to these other well-known variants is straightforward.

For the purpose of explanation, the buffer 110 receives packet payloads until a flush occurs, at which point the encoder 120 produces one or more output packets. Further embodiments of system 100 may use parallel processing, pipelining, speculative execution, streamed processing, or otherwise perform its functions in an interleaved or parallel manner. All of these types of systems may utilize embodiments of the invention to determine the framing of data, that is, when to wait to buffer additional input data versus when to process and output data.

Figure 2:
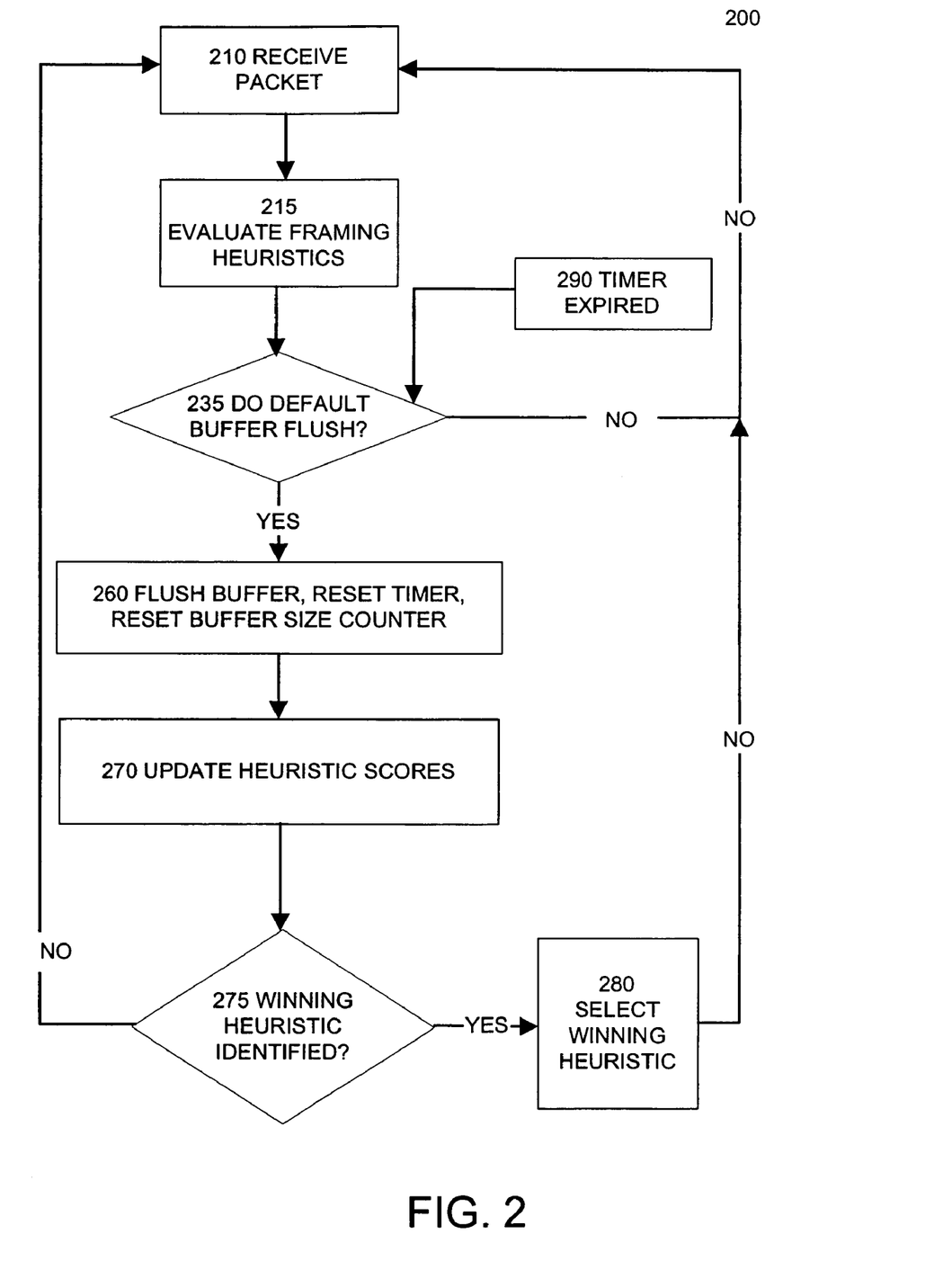
FIG. 2 shows a method for selecting a framing heuristic according to an embodiment of the invention.
Figure 3:
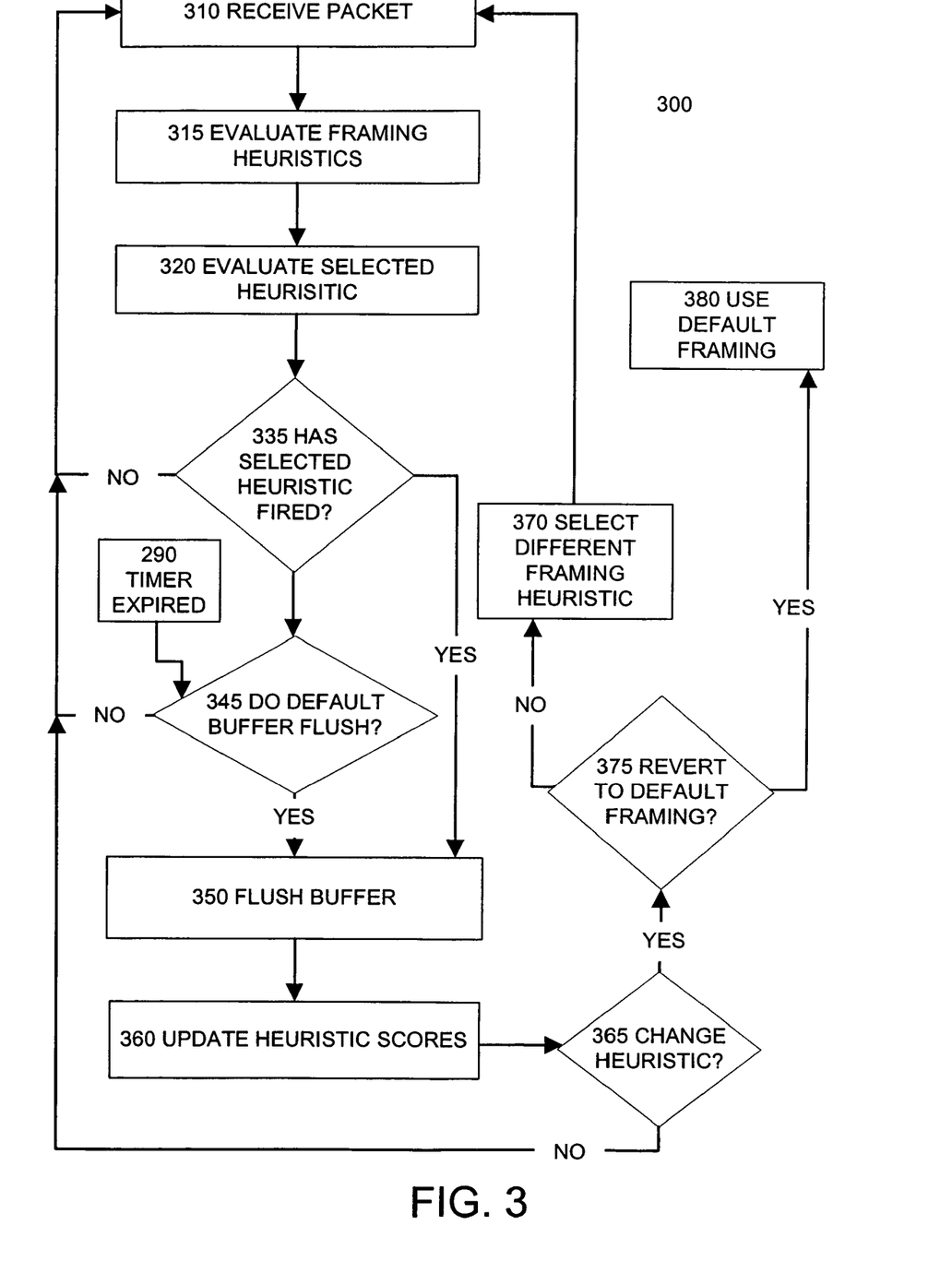
FIG. 3 shows a method of framing network traffic and updating framing heuristics according to an embodiment of the invention.

FIGS. 2 and 3 illustrate the operation of controller 150 according to an embodiments of the invention. FIG. 2 shows a method for selecting a framing heuristic according to an embodiment of the invention, and FIG. 3 shows a method of framing network traffic and updating framing heuristics according to an embodiment of the invention.

Controller 150 evaluates network traffic with respect to multiple alternative framing heuristics. Each framing heuristic specifies a different set of rules used to frame network traffic. When the rules of a framing heuristic are satisfied, the framing heuristic produces a signal or "fires," indicating that the buffer should be flushed of data and packets should be output.

As discussed in detail below, the controller 150 speculatively applies multiple framing heuristics to the current network traffic to evaluate the performances of the framing heuristics. The results of the framing heuristics as applied to the current network traffic are collected and assigned scores or ranks. The framing heuristic with the best score is then selected by the controller 150 to be used for actually framing the current and subsequent network traffic.

As additional network traffic is processed, controller 150 may continue to speculatively execute and score one or more alternative framing heuristics in addition to the selected framing heuristic. If an alternative framing heuristic scores better than the selected framing heuristic, for example due to changes in the characteristics of the network traffic, then the controller 150 may switch its selection to the alternative framing heuristic for framing network traffic.

FIG. 2 shows a method 200 for selecting a framing heuristic according to an embodiment of the invention. The controller 150 is configured with a number of different alternative framing heuristics that it may apply to the network traffic. In an embodiment, in its initial state the controller 150 uses a Nagle algorithm as a default framing behavior until a specialized framing heuristic is selected. Method 200 processes network traffic, evaluates alternative framing heuristics, and may select one of the alternative framing heuristics to process network traffic.

Step 210 receives a data from a network packet. Data from network packets may be stored in a buffer or other type of hardware or software data memory, as described in system 100. Upon the receipt of data from a network packet, step 215 evaluates one or more framing heuristics with respect to the data received in step 210 as well as any other network packet data previously stored in the buffer from prior iterations of step 210. Step 215 may evaluate the framing heuristics sequentially, in parallel, or in pipelined or interleaved manner using one or more processors or other information processing devices.

In evaluating each framing heuristic, step 215 determines whether the rule or rules specified by the framing heuristic are satisfied by the network packet data received in step 210 and/or stored in the buffer. If a framing heuristic's rules are satisfied, the framing heuristic is said to have been triggered or "fired." For a framing heuristic that has "fired," an embodiment of step 215 records the size of the buffer at the time the heuristic fires. In further embodiments, step 215 records other attributes associated with the framing heuristic, such as the number of times the framing heuristic has fired since the last scoring update, all or a portion of the data most recently received prior to the framing heuristic firing, either for a fixed amount of data or for the data following other data having a predetermined pattern.

Step 235 determines whether a buffer flush should occur due to the default framing behavior, such as a Nagle algorithm. In an embodiment, step 235 compares the size of the buffer with a predetermined size limit and compares the time elapsed from the receipt of the first data in the buffer with a predetermined time limit. If the buffer size exceeds the size limit or the elapsed time exceeds the time limit, then method 200 proceeds from step 235 to step 260 to perform a buffer flush. Otherwise, method 200 returns to step 210 to wait for additional network packet data. In a further embodiment, a timer expiring in step 290 may cause method 200 to skip steps 210 and 215 and proceed directly to step 235, rather than continue to wait for additional network packet data.

Step 260 flushes the buffer of network packet data. The flushed data is then sent to an encoder, as described above, and eventually output as one or more output packets. Step 260 also resets the timer used to track the elapsed time from the receipt of the first data in the buffer and a counter used to track the amount of data stored in the buffer. Once reset, the timer will be paused until additional packet data is received in the next iteration of step 210.

Step 270 updates the scores of each framing heuristic based on whether the framing heuristic fired in the most recent iterations of steps 210, 215, and 235, and if so, the size of the buffer at the time the framing heuristic fired. For example, each framing heuristic is initialized with a score of 0 points. Each time step 235 determines that a buffer flush under the default behavior should occur, step 270 gives the fired framing heuristic with the largest accumulated buffer length 4 additional points, the fired framing heuristic with the second largest buffer 3 additional points, and so forth. Any framing heuristic that has not fired during the most recent iterations of steps 210, 215, and 235 is not given any additional points. These points are added to each framing heuristic's point totals accumulated from previous iterations of step 270. This scoring scheme is provided as an example and more complicated scoring schemes that take into account buffer size, packet latency, and other factors may be used.

In embodiments of step 270, any framing heuristic that fires may receive at least some additional points. In other embodiments of step 270, only a limited number of top-ranked framing heuristics receive additional points for firing. Other framing heuristics that fire but have lower ranks, for example due to the small size of the buffered data at the time of firing, may not receive any additional points.

Step 270 may use other arrangements to score framing heuristics. For example, if step 215 records the number of times the framing heuristic has fired since the last scoring update, then step 270 may update scores based on the heuristics that fired the least or most. If step 215 records all or a portion of the data most recently received prior to the framing heuristic firing, then step 270 may score framing heuristics based data most similar to or most different from a specified data pattern.

Step 275 examines the total scores of the framing heuristics to determine if there is a winning framing heuristic. For example, after a number iterations of step 260, such as five buffer flushes or another configurable value, the step 275 selects the framing heuristic with the highest total score as the winning framing heuristic. If no winner emerges, method 200 returns to step 210 to await additional network packet data and further evaluate the framing heuristics.

If step 275 identifies a winning framing heuristic, step 280 selects the winning framing heuristic to control framing of subsequent network traffic. An embodiment of the operation of the controller 150 using a selected framing heuristic is illustrated by method 300 of FIG. 3.

FIG. 3 shows a method 300 of framing network traffic and updating framing heuristics according to an embodiment of the invention. Method 300 of FIG. 3 is similar to method 200 of FIG. 2, except that the selected framing heuristic is allowed to trigger buffer flushes in addition to the default framing behavior.

Method 300 initially has one selected framing heuristic controlling buffer flushes and a number of alternative framing heuristics that are speculatively evaluated against the network traffic, but which do not control framing of the network traffic.

Step 310 receives data from a network packet. Like step 210, the data from a network packet is stored in a buffer or other data storage mechanism along with any data from previously received network packets that has yet to be flushed and converted to output packets.

Upon receiving data from a network packet, step 315 evaluates one or more framing heuristics with respect to the data received in step 310 as well as any other network packet data previously stored in the buffer from prior iterations of step 310. Step 315 may evaluate the framing heuristics sequentially, in parallel, or in pipelined or interleaved manner using one or more processors or other information processing devices. Like step 215, step 315 determines whether the rule or rules specified by the framing heuristic are satisfied by the network packet data received in step 310 and/or stored in the buffer. For a framing heuristic that has "fired," an embodiment of step 315 records the size of the buffer at the time the framing heuristic fires.

Step 320 similarly evaluates the selected framing heuristic with respect to the data received in step 310 as well as any other network packet data previously stored in the buffer from prior iterations of step 310. In an embodiment, the selected framing heuristic may be determined from a previous iteration of method 200, as discussed above.

Step 335 determines whether the selected framing heuristic has fired. If so, method 300 proceeds to step 350 to flush the buffer and produce one or more output packets from the buffer data. Conversely, if the selected framing heuristic has not fired, method 300 proceeds to step 345.

Step 345, like step 235, determines whether a buffer flush should occur due to the default framing behavior, such as a Nagle algorithm. In an embodiment, step 345 compares the size of the buffer with a predetermined size limit and compares the time elapsed from the receipt of the first data in the buffer with a predetermined time limit. If the buffer size exceeds the size limit or the elapsed time exceeds the time limit, then method 300 proceeds from step 345 to step 350 to perform a buffer flush. Otherwise, method 300 returns to step 310 to wait for additional network packet data. In a further embodiment, a timer expiring in step 390 may cause method 300 to skip steps 310, 315, 320, and 335 and proceed directly to step 345, rather than continue to wait for additional network packet data.

Step 350, similar to step 260, flushes the buffer of network packet data. The flushed data is then sent to an encoder, as described above, and eventually output as one or more output packets. Step 350 also resets the timer used to track the elapsed time from the receipt of the first data in the buffer and a counter used to track the amount of data stored in the buffer. Once reset, the timer will be paused until additional packet data is received in the next iteration of step 310.

Following, or concurrent with, the buffer flush in step 350, step 360 updates the scores of the framing heuristics based on whether each of the framing heuristics fired in the most recent iterations of steps 310, 315, 320, and 335, and if so, the size of the buffer at the time the framing heuristic fired. For example, each framing heuristic, including the selected framing heuristic, is initialized with a score of 0 points. If the buffer flush of step 350 was triggered by the default framing behavior specified in step 345, step 360 subtracts 4 points from the score of the selected framing heuristic. For any other framing heuristics that fired before the buffer flush, step 360 gives an additional 4 points to the framing heuristic with the largest buffer size at the time of firing, an additional 3 points to the framing heuristic with the next largest buffer size, and so forth.

Continuing with this example scoring, if the buffer flush of step 350 was triggered by the selected framing heuristic specified in step 335, then step 360 gives the selected framing heuristic an additional 4 points. Step 360 then gives additional points to any other framing heuristics that also fired during the previous iterations of steps 310, 315, 320, and 335. In this example, step 360 gives an additional 3 points to the non-selected framing heuristic with the largest buffer size at the time of firing, an additional 2 points to the non-selected framing heuristic with the next largest buffer size, and so forth.

Continuing with this example scoring, if no non-selected framing heuristics fired during the previous iterations of steps 310, 315, 320, and 335, step 360 records a timestamp and inhibits the selected framing heuristic from firing in response to the next packet data received. When the next network packet data is received in a subsequent iteration of step 310, if less than 2 ms or any other a configurable time threshold has elapsed from the timestamp, then the selected framing heuristic gets 4 points for previously firing. If the time difference is shorter than the threshold and none of the other framing heuristics fired, it still gets 4 points. Otherwise, if the time difference between the time the next packet data is received and the timestamp is less than 2 ms or any other time threshold value and if one or more non-selected framing heuristics fire in response to the next packet data, then step 360 gives 4 additional points non-selected framing heuristic with the longest buffer, 3 additional points to the framing heuristic with the next largest buffer length, and so on. This allows framing heuristics that produce larger packet sizes than the selected framing heuristic to receive higher scores, which may eventually be used to select a different framing heuristic to control the framing of the network traffic. This scoring scheme is provided as an example and more complicated scoring schemes that take into account buffer size, packet latency, and other factors may be used.

Following the update of framing heuristic scores in step 360, step 365 evaluates the scores of the selected framing heuristic and the non-selected framing heuristics to determine whether a different framing heuristic should be selected to control the framing of network traffic. In an example embodiment, if the selected framing heuristic no longer has the highest score or has a score of zero, method 300 will proceed to step 375 to select a different framing heuristic. In step 375, if none of the framing heuristics have a score above a threshold value, then the system will revert to the default framing behavior in step 380. In an embodiment, step 380 performs in a manner similar to method 200 discussed above. Alternatively, if one or more of the framing heuristics has a score above a threshold value, method 300 will proceed from step 375 to step 370 to select the framing heuristic with the highest score. This newly selected framing heuristic will be used in subsequent iterations of steps 320 and 335 as the selected framing heuristic. Following step 370, method 300 returns to step 310 to await the receipt of additional network packet data.

The above-described methods make use of framing heuristics to evaluate and potentially control the framing of network traffic. In general, a framing heuristic includes one or more rules or conditions that may be satisfied by attributes of a single network packet or by collective attributes of multiple network packets.

An example embodiment of a framing heuristic is whether the newly-received packet data has the TCP PUSH flag set, which indicates that the received data should be delivered to the receiving application and is a hint of as to the logical boundary in the data stream. An embodiment of a system can implement this example framing heuristic by keeping a resettable flag in the TCP stack. Anytime the system detects the PUSH flag in the TCP stream, it sets the flag. Then, a portion of the network acceleration system reads if the flag is set or not. If so, the flag is reset and another flag or indicator is set to indicate that this example framing heuristic has fired.

Another example embodiment of a framing heuristic determines if the received packet was a full MTU. If the packet was not a full MTU, then the framing heuristic is fired. This example framing heuristic is useful for TCP stacks that don't set the PUSH flag.

A third example embodiment of a framing heuristic determines if the end of the buffer is a CR/LF pair. If the buffer ends with a CR/LF pair, then the framing heuristic is fired. This framing heuristic is useful for command-line based communications protocols.

A fourth example embodiment of a framing heuristic determines if the end of the buffer is a NULL. If the buffer ends with a NULL, then the framing heuristic is fired. This framing heuristic is useful for some binary protocols that use NULL-termination.

Other example framing heuristics may detect specific characteristics associated with particular types of network traffic, communication protocols, or applications. An example framing heuristic can identify network traffic associated with one or more related SQL transactions and apply a different buffer flush scheme for this type of network traffic. Another example framing heuristic fires based on other byte sequences, different from CR/LF or NULL, which may be used delimiters of transaction boundaries for particular kinds of network traffic.

In an embodiment, the network acceleration system may treat each direction of a TCP or other similar connection independently and evaluate the framing heuristics for one direction independent of the reverse direction. Thus, methods 200 and 300 may be applied separately to each connection (and each direction within a connection). The network acceleration system may also cache the results of the selection process outlined in FIG. 2 based on the traffic's destination port number, source address, destination address, DSCP marking, VLAN number, or any of a number of other well-known ways of identifying similarities in network traffic, singly or in combination. In addition to techniques that identify traffic by examining header fields, the caching may also be based on similarities of content, either from well-known deep-packet inspection techniques or from similarities to traffic patterns known through previous network acceleration processing.

In an embodiment, the network acceleration system may implement methods 200 and 300 within multiple execution layers of a system architecture. For example, a system or kernel layer may handle low-level network interactions and a high-level application layer provides network acceleration functions. In this embodiment, the functionality of framing heuristics is divided between these two layers. For example, a networking module in the kernel layer can apply framing heuristics to the network traffic, setting flags or other indicators when framing heuristics fire. The application layer can perform a buffer flush in response to default or selected framing heuristics, update framing heuristic scores, and select alternative framing heuristics when necessary, as described above.

In further embodiments, the operation of the controller may configured or altered manually: for some or all network traffic, the user may choose to disable the use of framing heuristics to control framing. Even when disabled, a user may choose to enable the speculative evaluation of framing heuristics to determine whether they should be applied to control the framing of network traffic. A user may further choose to disable the computation and application of framing heuristics entirely, so that the network acceleration system uses only the default framing behavior, such as Nagle-based framing.

Although the invention has been discussed with respect to specific embodiments thereof, these embodiments are merely illustrative, and not restrictive, of the invention. Furthermore, the system architecture discussed above is for the purposes of illustration. The invention can be implemented in numerous different forms including as a stand-alone application or as a module integrated with other applications. Thus, the scope of the invention is to be determined solely by the claims.

What is claimed is:

1. A method of determining an optimal framing of network traffic, the method comprising:
   receiving a first data stream over a first time period;
   applying a plurality of framing heuristics to the first data stream that is received to generate a result for each of the plurality of framing heuristics as applied to the first data stream received;
   determining a scoring metric value for each result of the plurality of framing heuristics;
   ranking at least a portion of the plurality of framing heuristics according to their respective scoring metric values; and
   selecting at least one of the plurality of framing heuristics in response to the ranking, wherein the selected at least one of the plurality of framing heuristics is used for framing the first data stream received and for framing a second data stream that is received at a second time period that is subsequent to the first time period.

2. The method of claim 1, further comprising:
providing the selected ones of the plurality of framing heuristics to a controller; and
framing network traffic using the selected ones of the plurality of framing heuristics.

3. The method of claim 2, wherein the network traffic includes the first data stream.

4. The method of claim 1, wherein the first time period is determined by a selected framing heuristic applied to the first data stream.

5. The method of claim 4, wherein the selected framing heuristic implements a default framing behavior.

6. The method of claim 5, wherein the default framing behavior limits the first time period to the lesser of a predetermined elapsed time or a predetermined size of the received first data stream.

7. The method of claim 4, wherein the selected framing heuristic is determined from a previous iteration of receiving the first data stream, evaluating the plurality of framing heuristics on the first data stream, ranking at least a portion of the plurality of framing heuristics, and selecting at least one of the plurality of framing heuristics.

8. The method of claim 1, wherein:
evaluating the plurality of framing heuristics comprises, for each of the plurality of framing heuristics, activating the framing heuristic in response to the first data stream satisfying to the framing heuristic; and
determining the scoring metric value for each of the plurality of framing heuristics comprises determining a scoring metric value for each activated framing heuristic.

9. The method of claim 8, wherein:
activating the framing heuristic further comprises determining for each activated framing heuristic a size of the first data stream at the time the framing heuristic is satisfied; and
determining the scoring metric value comprises:
comparing the sizes associated with the activated framing heuristics to determine a size rank value for each activated framing heuristic; and
assigning the scoring metric values to the activated framing heuristics according to their respective size rank values.

10. The method of claim 8, wherein selecting at least one of the plurality of framing heuristics in response to the ranking comprises:
selecting at least one of the plurality of framing heuristics having a scoring metric value better than a threshold value.

11. The method of claim 8, wherein selecting at least one of the plurality of framing heuristics in response to the ranking comprises:
selecting at least one of the plurality of framing heuristics having a scoring metric value better than a scoring metric value of a currently selected framing heuristic, wherein the scoring metric value of the currently selected framing heuristic is determined by evaluating the currently selected framing heuristic on the first data stream.

12. The method of claim 1, wherein receiving the first data stream comprises storing the first data stream in a data buffer and wherein the plurality of framing heuristics trigger a flush of the data buffer, thereby providing data for at least one output network packet.

13. A method of framing network traffic, the method comprising:
receiving a first input packet data;
adding the first input packet data to buffered data;
in response to receiving the first input packet data, evaluating a plurality of framing heuristics on at least a portion of the buffered data;
for each of the plurality framing heuristics, activating the framing heuristic in response to the portion of the buffered data satisfying the framing heuristic;
updating scoring metric values for at least the activated framing heuristics in response to the determination that the portion of the buffered data satisfies a selected one of the plurality of framing heuristics;
initiating a flush of the buffered data in response to the determination that the portion of the buffered data satisfies the selected one of the plurality of framing heuristics; and
selecting at least a different one of the plurality of framing heuristics in response to the updated scoring metric satisfying a criteria, wherein the selected at least one of the plurality of framing heuristics is used for framing the first input packet data received and for framing a second input packet data that will be subsequently received.

14. The method of claim 13, further comprising repeating the steps of receiving, adding, evaluating, activating for a second input packet data.

15. The method of claim 13, wherein the criteria includes the different one of the plurality of framing heuristics having a scoring metric value better than a threshold value.

16. The method of claim 13, wherein the criteria includes the different one of the plurality of framing heuristics having a scoring metric value better than the scoring metric value of the selected one of the plurality of framing heuristics.

17. The method of claim 13, further comprising:
in response to the portion of the buffered data not satisfying the selected one of the plurality of framing heuristics, initiating a flush of the buffered data in response to the determination that a default framing heuristic is satisfied.

18. The method of claim 17, wherein the default framing heuristic initiates the flush of the buffered data in response to an expiration of a predetermined time period or a size of the buffered data exceeding a predetermined size limit.

19. The method of claim 13, further comprising:
outputting at least one output packet including at least a portion of the buffered data.

20. The method of claim 13, wherein updating scoring metric values for at least the activated framing heuristics comprises:
increasing a scoring metric value of at least a portion of the activated framing heuristics.

21. The method of claim 20, wherein activating the framing heuristic comprises storing a size of the buffered data at the time the portion of the buffered data satisfies the framing heuristic; and
wherein the increase of the scoring metric value for each of the portion of the activated framing metrics is based on the respective size of the buffered data at the time the portion of the buffered data satisfies the framing heuristic.

22. The method of claim 13, wherein at least one of the plurality of framing heuristics is activated in response to a TCP flag.

23. The method of claim 13, wherein at least one of the plurality of framing heuristics is activated in response to the size of the buffered data being equal to a MTU size.

24. The method of claim 13, wherein at least one of the plurality of framing heuristics is activated in response to carriage return/line feed character.

25. The method of claim 13, wherein at least one of the plurality of framing heuristics is activated in response to at least one character delimiting a transaction.

26. The method of claim 13, wherein at least one of the plurality of framing heuristics is activated in response to an SQL transaction.

* * * * *